(12) United States Patent
Himayat et al.

(10) Patent No.: US 8,682,266 B2
(45) Date of Patent: *Mar. 25, 2014

(54) TECHNIQUES TO ENHANCE DIVERSITY FOR A WIRELESS SYSTEM

(75) Inventors: Nageen Himayat, Fremont, CA (US); Sumeet Sandhu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,610

(22) Filed: Sep. 12, 2012

(65) Prior Publication Data

US 2013/0010886 A1 Jan. 10, 2013

Related U.S. Application Data

(63) Continuation of application No. 13/294,812, filed on Nov. 11, 2011, now Pat. No. 8,412,129, which is a continuation of application No. 12/454,726, filed on May 20, 2009, now Pat. No. 8,060,033, which is a continuation of application No. 11/095,207, filed on Mar. 30, 2005, now Pat. No. 7,539,463.

(51) Int. Cl.
| | |
|---|---|
| H04B 7/02 | (2006.01) |
| H04K 1/00 | (2006.01) |
| H04L 1/02 | (2006.01) |
| H04B 7/06 | (2006.01) |

(52) U.S. Cl.
CPC .............. *H04B 7/0669* (2013.01); *H04B 7/068* (2013.01)
USPC ............ 455/101; 455/103; 455/59; 375/260; 375/267; 370/342; 370/344

(58) Field of Classification Search
USPC .................... 455/101, 103, 59; 375/260, 267; 370/342, 344
See application file for complete search history.

(56) References Cited

U.S. PATENT DOCUMENTS

| | | | |
|---|---|---|---|
| 5,933,421 | A | 8/1999 | Alamouti et al. |
| 6,377,631 | B1 | 4/2002 | Raleigh |
| 6,377,632 | B1 | 4/2002 | Paulraj et al. |
| 6,952,454 | B1 | 10/2005 | Jalali et al. |
| 7,002,900 | B2 | 2/2006 | Walton et al. |
| 7,107,849 | B2 | 9/2006 | Sugiyama et al. |
| 7,218,666 | B2 | 5/2007 | Baum et al. |

(Continued)

FOREIGN PATENT DOCUMENTS

JP    2003-244092 A    8/2003

OTHER PUBLICATIONS

U.S. Appl. No. 60/624,235, "Interleaving and parsing for MIMO-OFDM systems", filed Nov. 2, 2004, 31 pages.

(Continued)

*Primary Examiner* — Duc M Nguyen
(74) *Attorney, Agent, or Firm* — Sutherland Asbill & Brennan LLP

(57) ABSTRACT

A system, apparatus, method and article to manage diversity for a wireless multicarrier communication system are described. An apparatus may include a diversity agent to couple to a transmitter, the diversity agent to convert a determined number of input bits into symbols, interleave the symbols across multiple spatial streams, and map the symbols to tones for each spatial stream. Other embodiments are described and claimed.

15 Claims, 7 Drawing Sheets

(56) References Cited

U.S. PATENT DOCUMENTS

| | | | |
|---|---|---|---|
| 7,230,978 | B2 | 6/2007 | Bitterlich et al. |
| 7,315,577 | B2 | 1/2008 | Shao |
| 7,376,117 | B2 | 5/2008 | Erlich et al. |
| 7,440,510 | B2 | 10/2008 | Sandhu et al. |
| 7,539,463 | B2 * | 5/2009 | Himayat et al. ............. 455/101 |
| 7,573,946 | B2 | 8/2009 | Sandhu |
| 8,060,033 | B2 * | 11/2011 | Himayat et al. ............. 455/101 |
| 8,412,129 | B2 * | 4/2013 | Himayat et al. ............. 455/101 |
| 2002/0041635 | A1 | 4/2002 | Ma et al. |
| 2002/0119803 | A1 | 8/2002 | Bitterlich et al. |
| 2002/0126763 | A1 | 9/2002 | Jeong et al. |
| 2002/0132600 | A1 | 9/2002 | Rudrapatna |
| 2003/0043928 | A1 | 3/2003 | Ling et al. |
| 2003/0103584 | A1 | 6/2003 | Bjerke et al. |
| 2003/0123381 | A1 | 7/2003 | Zhuang et al. |
| 2003/0131302 | A1 | 7/2003 | Nobelen |
| 2003/0156570 | A1 | 8/2003 | Alamouti et al. |
| 2003/0156659 | A1 | 8/2003 | Hanaoka et al. |
| 2003/0235147 | A1 | 12/2003 | Walton et al. |
| 2003/0236080 | A1 | 12/2003 | Kadous et al. |
| 2004/0008648 | A1 | 1/2004 | Schmidl et al. |
| 2004/0081073 | A1 | 4/2004 | Walton et al. |
| 2004/0082356 | A1 | 4/2004 | Walton et al. |
| 2004/0178934 | A1 | 9/2004 | Balakrishnan et al. |
| 2005/0085197 | A1 | 4/2005 | Laroia et al. |
| 2005/0135493 | A1 | 6/2005 | Maltsev et al. |
| 2005/0152327 | A1 | 7/2005 | Erlich et al. |
| 2005/0159115 | A1 | 7/2005 | Sandhu |
| 2005/0201326 | A1 | 9/2005 | Lakkis |
| 2006/0018394 | A1 | 1/2006 | van Zelst et al. |
| 2006/0036924 | A1 | 2/2006 | Ghosh |
| 2006/0057969 | A1 | 3/2006 | Van Houtum |
| 2006/0104379 | A1 | 5/2006 | Li et al. |
| 2006/0107171 | A1 | 5/2006 | Skraparlis |
| 2010/0278034 | A9 | 11/2010 | Laroia et al. |

OTHER PUBLICATIONS

International Telecommunication Union "Recommendation ITU-R M.1225 Guidelines for Evaluation of Radio Transmission Technologies for IMT-2000", 1997.

Wiegandt et al., "High-Performance Carrier Interferometry OFDM WLANs: RF Testing", ISBN: 0-7803-7802-4, 2003, pp. 203-207.

Heiskala et al., "OFDM Wireless LANs: A Theoretical and Practical Guide", SAMS, 2002.

Sandhu et al. "Space-frequency bit-interleaved coded modulation for MIMO-OFDM/OFDMA systems," The Institute of Electrical and Electronics Engineers, Inc.,IEEE 802.16 Broadband Wireless Access Working Group, IEEE C802.16e-04/533, 2004.

The Institute of Electrical and Electronics Engineers, Inc., "Draft IEEE Standard for Local and Metropolitan Area Networks; Part 16: Air Interface for Fixed Broadband Wireless Access Systems," IEEE P802.16-REVd/D5-2004, 2004.

The Institute of Electrical and Electronics Engineers, Inc., "Draft IEEE Standard for Local and Metropolitan Area Networks; Part 16: Air Interface for Fixed and Mobile Broadband Wireless Access Systems—Amendment for Physical and Medium Access Control Layers for Combined Fixed and Mobile Operation in Licensed Bands," IEEE P802.16e/D5, 2004.

Shao et al., "High rate space frequency block codes for next generation 802.11 WLANs", Proceedings of International Conference on Communications, vol. 5, Jun. 2004, pp. 2995-2999.

Lee et al., "Space-time bit-interleaved coded modulation for OFDM systems," IEEE Transactions on Signal Processing, vol. 52, No. 3, Mar. 2004, pp. 820-825.

Song et al., "Rate-compatible punctured convolutionally (RCPC) space-frequency bit-interleaved coded modulation (SF-BICM)," Proceedings of International Conference on Communications, vol. 6, Jun. 2004, pp. 3284-3288.

Rende et al., "Bit interleaved space-frequency coded modulation for OFDM systems" Proceedings of International Conference on Communications, vol. 4, May 2003, pp. 2827-2831.

Panyuh et al., "Analysis of STFBC-OFDM for BWA in SUI channel", The Institute of Electrical and Electronics Engineers, Inc., IEEE 802.16 Broadband Wireless Access Working Group, IEEE c802, 16a—Feb. 18, Jan. 22, 2001.

Office Action received for U.S. Appl. No. 11/095,207, mailed on Aug. 15, 2008, 8 pages.

Office Action received for U.S. Appl. No. 11/095,207, mailed on Sep. 25, 2007, 9 pages.

Notice of Allowance received for U.S. Appl. No. 11/095,207, mailed on Jan. 16, 2009, 5 pages.

Office Action received for U.S. Appl. No. 12/454,726, mailed on Jan. 11, 2011, 6 pages.

Notice of Allowance received for U.S. Appl. No. 12/454,726, mailed on Jul. 1, 2011, 23 pages.

Office Action received for U.S. Appl. No. 11/095,207, mailed on Mar. 17, 2008, 8 pages.

Office Action received for U.S. Appl. No. 13/294,812, mailed on May 15, 2012, 11 pages.

Notice of Allowance received for U.S. Appl. No. 13/294,812, mailed on Sep. 24, 2012, 7 pages.

* cited by examiner

TECHNIQUES TO ENHANCE DIVERSITY FOR A WIRELESS SYSTEM

CROSS REFERENCE TO RELATED APPLICATIONS

This application is a continuation of U.S. Nonprovisional application Ser. No. 13/294,812, filed on Nov. 11, 2011 (incorporated herein by reference in its entirety), which is a continuation of U.S. application Ser. No. 12/454,726, filed on May 20, 2009 and issued as U.S. Pat. No. 8,060,033 (incorporated herein by reference in its entirety), which is a continuation of U.S. application Ser. No. 11/095,207, filed on Mar. 30, 2005 and issued as U.S. Pat. No. 7,539,463 on May 26, 2009 (incorporated herein by reference in its entirety).

BACKGROUND

Some wireless systems may use multiple antennas, such as a multiple-input, multiple-output (MINO) system. MIMO systems may use multiple antennas at both the transmitter and receiver. MIMO systems may transmit multiple data streams over the multiple antennas to provide spatial diversity to the overall communication signal. Spatial diversity may improve performance of a wireless system, such as providing greater range or throughput for the system.

Some wireless system may also use multiple carriers. A multicarrier system is typically characterized by a frequency band associated with a communication channel that is divided into a number of smaller sub-bands, sometimes referred to as subcarriers. Examples of multicarrier systems may include Orthogonal Frequency Division Multiplexing (OFDM) systems and Discrete Multi-tone (DMT) systems. A multicarrier system may communicate information by dividing the informational content into symbols, and then transmitting the symbols in parallel using a number of subcarriers. Interleaving symbols across subcarriers may provide a form of frequency diversity, which may also improve performance of the system.

The use of spatial diversity or frequency diversity may improve certain aspects of a wireless system. There are limitations, however, to the amount of spatial diversity or frequency diversity available to any given system. Consequently, techniques to improve spatial diversity and/or frequency diversity may increase performance of a wireless system.

DETAILED DESCRIPTION

Figure 1:
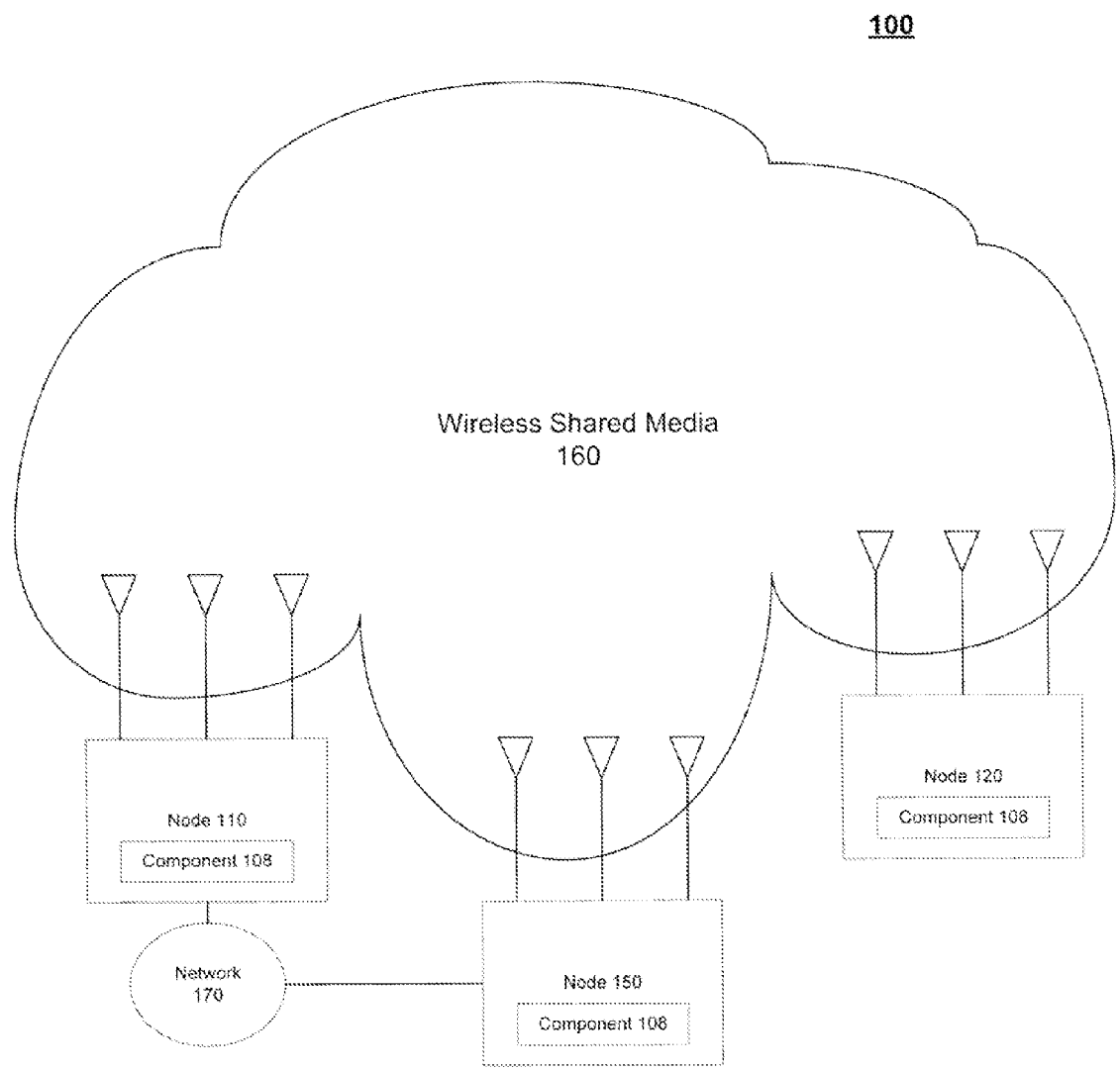
FIG. 1 illustrates one embodiment of a system.

FIG. 1 illustrates one embodiment of a system. FIG. 1 may illustrate a block diagram of a system 100. System 100 may comprise, for example, a communication system having multiple nodes. A node may comprise any physical or logical entity having a unique address in system 100. Examples of a node may include any network devices, such as a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may generally refer to any data representing content meant for a user, such as voice information, video information, audio information, text information, numerical information, alphanumeric symbols, graphics, images, and so forth. Control information may generally refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with various wireless local area network (WLAN) protocols, such as one or more of the IEEE 802.11 series of protocols. In another example, system 100 may operate in accordance with various wireless metropolitan area network (WMAN) mobile broadband wireless access (MBWA) protocols, such as a protocol from one or more of the IEEE 802.16 or 802.20 series of protocols. The embodiments are not limited in this context.

Referring again to FIG. 1, system 100 may comprise a wireless communication system. In one embodiment, system 100 may include one or more wireless communication devices, such as nodes 110, 120, 150. Nodes 110, 120, 150 may be arranged to communicate information signals over wireless shared media 160 using one or more wireless transmitters/receivers ("transceivers"). Information signals may include any type of signal encoded with media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may include nodes 110, 120. Nodes 110, 120 may comprise fixed devices having wireless capabilities. A fixed device may comprise a generalized equipment set to provide connectivity, management, and control of another device, such as mobile devices. Examples for nodes 110, 120 may include a wireless access point (AP), base station or node B, router, switch, hub, gateway, and so forth. In one embodiment, for example, nodes 110, 120 may comprise base stations for a WMAN system. Although some embodiments may be described with nodes 110, 120 implemented as base stations by way of example, it may be appreciated that other embodiments may be implemented using other wireless devices as well.

In one embodiment, base stations 110, 120 may also provide access to a network 170 via wired communications media. Network 170 may represent any of a broad range of communication networks including, for example a plain-old telephone system (POTS) communication network, a personal area network (PAN), a local area network (LAN), metropolitan area network (MAN), wide-area network (WAN), global area network (e.g., the Internet), cellular network, and the like. The embodiments are not limited in this context.

In one embodiment, system 100 may include node 150. Node 150 may comprise, for example, a mobile device or a fixed device having wireless capabilities. A mobile device may comprise a generalized equipment set to provide connectivity to other wireless devices, such as other mobile devices or fixed devices. Examples for node 150 may include a computer, server, workstation, notebook computer, hand-held computer, telephone, cellular telephone, PDA, combination cellular telephone and PDA, one-way pagers, two-way pagers, and so forth. In one embodiment, for example, node 150 may comprise a mobile device, such as a mobile subscriber station (MSS) for a WMAN. Although some embodiments may be described with MSS 150 implemented as a wireless device for a MSS by way of example, it may be appreciated that other embodiments may be implemented using other wireless devices as well. For example, node 150 may also be implemented as a fixed device such as a computer arranged with a wireless transceiver, a mobile station (STA) for a WLAN, and so forth. The embodiments are not limited in this context.

Nodes 110, 120, 150 may have one or more wireless transceivers and wireless antennas. In one embodiment, for example, nodes 110, 120, 150 may each have multiple transceivers and multiple antennas. The use of multiple antennas may be used to provide a spatial division multiple access (SDMA) system or a MIMO system in accordance with one or more of the IEEE 802.16 series of standards, such as one or more of the IEEE 802.16e proposed standards, for example. The embodiments are not limited in this context.

In general operation, the nodes of system 100 may operate in multiple operating modes, For example, nodes 110, 120, 150 may operate in various operating modes, such as a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media 160. In a MIMO operating mode, two or more transmitters and two or more receivers may be used to communicate information signals over wireless shared media 160. When in a MIMO operating mode, some embodiments may be arranged to operate in a spatial multiplexing mode to further enhance performance of system 100.

In one embodiment, one or more nodes of system 100 may use an advanced OFDM processing technique for a MIMO transceiver that utilizes more than one transmit/receive chain at each end of the wireless link. The combination of MIMO and OFDM (MIMO-OFDM) in system 100 may be particularly desirable for high-throughput WLAN and WMAN applications, for example. The embodiments are not limited in this context.

In one embodiment, the MIMO-OFDM system may use one or more transmit diversity techniques to provide a near-optimal method for mapping uncoded information received from a host device, or an application/agent executing thereon, to multiple antennas and OFDM tones. The uncoded information may include, for example, various types of symbols, such as quadrature amplitude modulation (QAM) symbols. The embodiments are not limited in this context.

While the transmit diversity architecture of some embodiments may provide full-order diversity, the transmit diversity architecture may only provide a limited code rate per OFDM slot. Consequently, the transmit diversity architecture may be extended to provide a higher code rate by means of space-frequency interleaving. As developed more fully below, space-frequency interleaving provides a near-optimal technique for mapping coded information onto multiple antennas and OFDM tones. Examples of coded information may include any type of information processed by an encoding technique, such as forward error correcting (FEC) encoding, convolutional encoding, Reed Solomon encoding, LDPC encoding, trellis encoding, turbo encoding, Bose-Chaudhuri-Hocquenghem (BCH) encoding, and so forth. The embodiments are not limited in this context.

Some embodiments may implement enhanced transmit diversity and space-frequency techniques to improve performance of a MIMO-OFDM system, such as system 100. In one embodiment, for example, nodes 110, 120, 150 may each include a component 108. Component 108 may be arranged to implement one or more transmit diversity and/or space-frequency techniques for nodes 110, 120, 150. Component 108 may comprise, among other elements, a diversity agent. In one embodiment, the diversity agent may perform various combinations of symbol level spatial interleaving and/or block concatenation. The embodiments are not limited in this context.

In one embodiment, for example, the diversity agent may perform symbol level spatial interleaving. The diversity agent may convert a determined number of input bits into symbols, interleave the symbols across multiple spatial streams, and map the symbols to tones for each spatial stream. The embodiments are not limited in this context.

In one embodiment, for example, the diversity agent may perform symbol level spatial interleaving with block concatenation. For example, the diversity agent may group the determined number of input bits into a single block (e.g., FEC block), and convert the block to symbols (e.g., QAM symbols). Block concatenation may allow larger blocks relative to other implementations. The embodiments are not limited in this context.

In one embodiment, for example, the diversity agent may perform symbol level spatial interleaving without block concatenation. For example, the diversity agent may segment the determined number of input bits into multiple blocks (e.g., FEC blocks), and convert each block to symbols (e.g., QAM symbols). The use of multiple blocks may be implemented with less complexity at the cost of reduced efficiency relative to using a single block as in other implementations. The embodiments are not limited in this context.

In some embodiments, the diversity agent may be further arranged to perform a cyclic shift of each spatial stream prior to mapping the symbols to each spatial stream. This may ensure that adjacent coded bits are not mapped to the same tone on different antennas, thereby potentially improving performance and providing greater spatial diversity. These and other embodiments of component 108 may be described in more detail with reference to FIG. 2.

Figure 2:
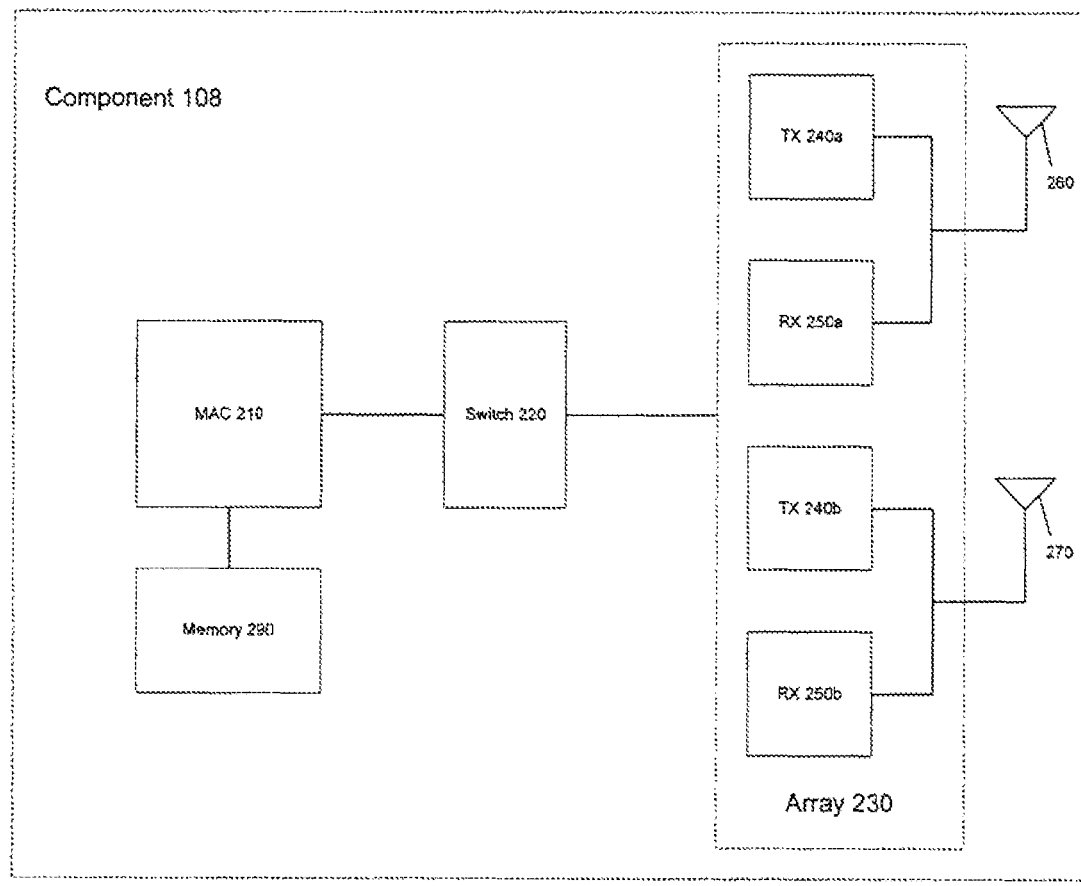
FIG. 2 illustrates one embodiment of a component.

FIG. 2 illustrates one embodiment of a component. FIG. 2 may illustrate a block diagram for component 108 of system 100. Component 108 may be implemented as part of nodes 110, 120 or 150 as described with reference to FIG. 1. As shown in FIG. 2, component 108 may comprise multiple elements, such as processor 210, switch (SW) 220, a transceiver array 230, and a memory 290. Some elements may be implemented using, for example, one or more circuits, components, registers, processors, software subroutines, or any combination thereof. Although FIG. 2 shows a limited number of elements, it can be appreciated that more or less elements may be used in component 108 as desired for a given implementation. The embodiments are not limited in this context.

In one embodiment, component 108 may include a transceiver array 230. Transceiver array 230 may be implemented as, for example, a MIMO system. Transceiver array 230 may include two transmitters 240a and 240b, and two receivers 250a and 250b. Although transceiver array 230 is shown with a limited number of transmitters and receivers for purposes of clarity, it may be appreciated that transceiver array 230 may include any desired number of transmitters and receivers. The embodiments are not limited in this context.

In one embodiment, transmitters 240a-b and receivers 250a-b of transceiver array 230 may be implemented as OFDM transmitters and receivers. Transmitters 240a-b and receivers 250a-b may communicate data frames with other wireless devices. For example, when implemented as part of base stations 110, 120, transmitters 240a-b and receivers 250a-b may communicate data frames with MSS 150. When implemented as part of MSS 150, transmitters 240a-b and receivers 250a-b may communicate data frames with base stations 110, 120. The data frames may be modulated in accordance with a number of modulation schemes, to include Binary Phase Shift Keying (BPSK), Quadrature Phase-Shift Keying (QPSK), M-ary PSK (MPSK), M-ary QAM (MQAM), QAM, 16-QAM, 64-QAM, 128-QAM, 356-QAM, and so forth, depending on a desired coding rate. The embodiments are not limited in this context.

In one embodiment, transmitter 240a and receiver 250a may be operably coupled to an antenna 260, and transmitter 240b and receiver 250b may be operably coupled to antenna 270. Examples for antennas 260, 270 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. The embodiments are not limited in this context.

In one embodiment, transceiver array 230 may comprise any of a variety of multicarrier wireless communication transceivers known in the art. In this regard, a transmitting element of transmitters 240a-b may receive information from a host device, process the received information to generate an OFDM transmit signal, and then transmit that OFDM signal over a link (e.g., forward link) to a remote device via one or more antennas. A receiving element of receivers 250a-b may receive multiple instances of the forward link via one or more antennas 260, 270, and selectively process the received signals to extract a representation of the originally encoded information. A diversity agent may enable transceiver array 230 to implement certain MIMO-OFDM operations, as described further below. According to one embodiment, each of the transmitters 240a-b and receivers 250a-b may include one or more processing chains. The embodiments are not limited in this context.

In one embodiment, component 108 may include a processor 210. Processor 210 may be implemented as a general purpose processor. For example, processor 210 may comprise a general purpose processor made by Intel® Corporation, Santa Clara, Calif. Processor 210 may also comprise a dedicated processor, such as a controller, microcontroller, embedded processor, a digital signal processor (DSP), a network processor, an input/output (I/O) processor, a media processor, and so forth. The embodiments are not limited in this context.

In one embodiment, component 108 may include a memory 290. Memory 290 may comprise any machine-readable or computer-readable media capable of storing data, including both volatile and non-volatile memory. For example, the memory may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

In one embodiment, the nodes of system 100 may operate in accordance with one or more of the IEEE 802.11, 802.16 or 802.20 series of specifications. A wireless device operating in accordance with such specifications typically requires the implementation of at least two layers. The first layer is the 802.xx MAC layer. In general, the MAC layer manages and maintains communications between the wireless devices by coordinating access to a shared radio channel and utilizing protocols to enhance communications over wireless shared media 160. The second layer is the 801xx physical (PHY) layer. The PHY layer may perform the operations of carrier sensing, transmission, and receiving of 802.xx frames. The PHY layer is typically implemented using dedicated hardware. The MAC layer, however, is typically implemented using a combination of dedicated hardware and dedicated software.

In one embodiment, for example, processor 210 may be arranged to perform various baseband and MAC layer operations. For example, processor 210 may be implemented as a media access control (MAC) processor. In addition to the typical baseband and MAC layer operations, MAC 210 may implement at least a subset of the features of a diversity agent in accordance with one or more MIMO-OFDM systems, and/or may provide control over a diversity agent implemented within associated transceiver array 230. The embodiments are not limited in this context.

In some embodiments, component 108 may be used to implement a diversity agent. The diversity agent may be arranged to manage one or more diversity elements within the multicarrier wireless channel. On the transmit side of a communication channel, the diversity agent may receive information from a host device, application, agent, and so forth. The diversity agent may selectively map the received information to multiple antennas and/or OFDM tones to generate a MIMO-OFDM transmit signal. In support of the receive side of the communication channel, the diversity agent may selectively demap the information received via a MIMO-OFDM wireless channel 106 from multiple antennas and OFDM tones. While not specifically denoted in FIG. 2, the diversity agent may be implemented by one or more elements of component 108, such as MAC 210, memory 290, and/or transceiver array 230. The embodiments, however, are not limited in this context.

According to one example embodiment, the diversity agent may selectively process the received information to implement full-order transmit diversity. As developed below, the diversity agent may map uncoded information (e.g., QAM symbols) received from the host devices or applications executed thereon, onto multiple antennas and OFDM tones to effect spatial diversity in the transmit link of channel 106. The embodiments are not limited in this context.

According to one embodiment, the diversity agent may selectively process the received information to introduce space-frequency interleaving techniques to interleave the information onto multiple antennas and OFDM tones. The diversity agent may selectively map coded information (e.g., bits, bytes, blocks, symbols, frames, packets) received from the host device or applications executing thereon, onto multiple antennas and OFDM tones by performing one or more of antenna multiplexing, 802.xx interleaving, QAM mapping, and cyclic tone shifting. The embodiments are not limited in this context.

According to one embodiment, the diversity agent may also selectively implement innovative techniques for decoding information from a received OFDM channel. In this regard, the diversity agent may demap and/or deinterleave information received from wireless shared media 160 generated in accordance with one or both of the encoding techniques previously described. According to one embodiment, receive diversity agent receives information as decoded modulation information (e.g., bits) and generates de-mapped and/or de-interleaved information, respectively. The embodiments are not limited in this context.

Figure 3:
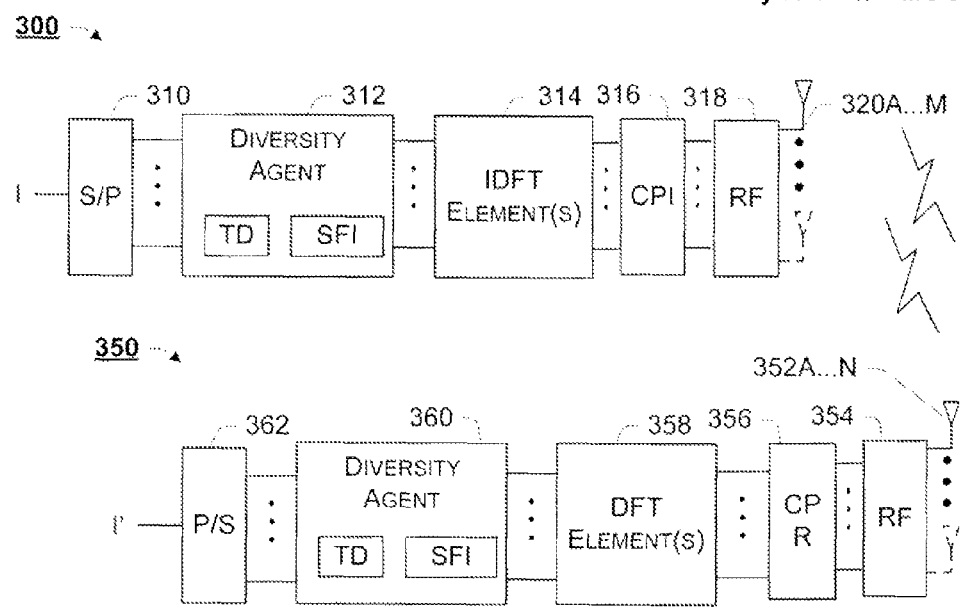
FIG. 3 illustrates one embodiment of a diversity architecture.

FIG. 3 illustrates one embodiment of a diversity architecture. FIG. 3 may illustrate a block diagram for diversity architecture 390 of component 108. Diversity architecture 390 may be implemented using one or more elements of component 108, such as MAC 210, transceiver array 230, and/or memory 290 as described with reference to FIG. 2. As shown in FIG. 3, diversity architecture 390 may comprise multiple elements. Some elements may be implemented using, for example, one or more circuits, components, registers, processors, software subroutines, or any combination thereof. Although FIG. 3 shows a limited number of elements, it can be appreciated that more or less elements may be used in diversity architecture 390 as desired for a given implementation. The embodiments are not limited in this context.

FIG. 3 may provide an example of a transmitter architecture and a receiver architecture according to one example embodiment. To illustrate these architectures within the context of a communication channel between two devices, a transmitter from one node (e.g., base station 110) and a receiver from another node (e.g., MSS 150) associated with a communication link are depicted. It may be appreciated that a transceiver in either node (110, 150) may comprise a transmitter architecture and a receiver architecture as detailed in FIG. 3, although the embodiments are not limited in this regard. It should also be appreciated that transmitter and receiver architectures of greater or lesser complexity that nonetheless implement the innovative transmit diversity and/or space-frequency interleaving techniques as described herein fall within the intended scope of the embodiments.

In one embodiment, diversity architecture 390 may include a transmitter architecture 300. Transmitter architecture 300 may comprise one or more of a serial to parallel (S/P) transform 310, a transmit diversity agent 312, one or more inverse discrete Fourier transform (IDFT) elements 314, and a cyclic prefix insertion (CPI) element 316. CPI element 316 may be coupled with one or more antennas 320A ... M through one or more associated radio frequency (RF) elements 318.

According to one embodiment, for example, transmitter architecture 300 may be implemented within transceiver array 230. Although depicted as a number of separate operational elements, it may be appreciated that one or more elements of transmitter architecture 300 may be combined into a multi-operational element, and conversely operational elements may be split into multiple operational elements without deviating from the intended embodiments.

In one embodiment, transmitter architecture 300 may include S/P transform 310. S/P transform 310 may receive information (e.g., bits, bytes, frames, symbols, etc.) from a host device (or, an application executing thereon, e.g., email, audio, video, etc.) for processing and subsequent transmission via wireless shared media 160. According to one embodiment, the received information is in the form of QAM symbols, wherein each symbol represents two bits, $b_i$ and $b_j$, for example. According to one embodiment, S/P transform 310 takes the information and generates a number of parallel substreams of the information, which are passed to one or more instances of diversity agent 312. Although depicted as a separate operational element. S/P transform 310 may also be included within diversity agent 312, or some other elements of transmitter 300.

According to one embodiment, diversity agent 312 may be arranged to selectively introduce an element of transmit diversity into the information streams received from S/P transform 310. In particular, according to one example embodiment, the informational information is selectively mapped to one or more antennas and OFDM tones. According to one example implementation, if information received from the host device at diversity agent 312 is not in the form of QAM symbols, diversity agent may perform pre-coding to map the received information to QAM symbols, although the embodiments are not limited in this regard. In fact, diversity agent may be arranged to introduce transmit diversity to any linear combination of input symbols.

In one embodiment, diversity agent 312 takes the input (e.g., QAM symbols) and repetitively disperses them (e.g., bits, symbols, etc.) across Mt transmit antennas, and a number (N) of OFDM tones for each of a plurality of Rayleigh fading channel taps (L), although the embodiments are not limited in this regard. By selectively dispersing the information in this manner, full order diversity may be achieved, as represented by Mt Mr L, where Mr is the number of receive antennas, for example.

In one embodiment, diversity agent 312 may also include resources to implement one or more space-frequency interleaving techniques. In this regard, diversity agent 312 may include one or more operational elements, such as a block generating element, a randomizing element, an encoding element, a bit interleaving element, an antenna multiplexing element, a tone interleaving element, a QAM interleaving element, a QAM mapping element and a cyclic tone shifting element, although the embodiments are not limited in this regard. According to one embodiment, diversity agent 312 may treat adjacent coded bits as one symbol, and spreads this information across space and frequency using a transmit diversity repetition scheme. According to one embodiment, the information received from S/P transform 310 is first interleaved across at least a subset of transmit antennas Mt, and then across a number of OFDM tones for each of a plurality of the Rayleigh fading channel taps (L), although the embodiments are not limited in this regard. The operational elements may not necessarily need to be applied in the order described above. Moreover, the amount of cyclic tone shift may be modified to any value between zero (0) and the number data tones (Nds), and there may be a cyclic shift across antennas instead of or in addition to, the shift across tones.

In one embodiment, information from the transmit diversity agent 312 is passed to one or more inverse discrete Fourier transform (IDFT) elements 314. According to one embodiment, IDFT elements 314 may comprise inverse fast Fourier transform (IFFT) elements, although the embodiments are not limited in this regard. According to one embodiment, the number of IDFT elements 314 may be commensurate with the number of transmit antennas, e.g., transmit RF chains. In this regard, IDFT elements 314 may receive a plurality (Z) of encoded substreams from diversity agent 312, and convert the information from a frequency domain representation to a time domain representation of the information, although the embodiments are not limited in this regard.

In one embodiment, IDFT elements 314 may pass the time domain information to CPI elements 316. According to one embodiment, CPI 316 may introduce a cyclical prefix, or a guard interval in the signal, before it is passed to an RF front-end 318 for amplification, filtering and subsequent transmission via an associated one or more antennas 320A . . . M.

In one embodiment, diversity architecture 390 may include a receiver architecture 350. Receiver architecture 350 may extract information processed by transmitter architecture 300. As shown in FIG. 3, an RF front-end 354 may receive a plurality of signals impinging on one or more receive antennas 352A . . . N. In accordance with one example embodiment, the number (N) of receive antennas is equal to Mr. According to one embodiment, each receive antenna has a dedicated receive chain, where the number of receive front-end elements 354, cyclic prefix removal (CPR) elements 356 and FFT elements are commensurate with the number (N) of receive antennas (e.g., Mr). The embodiments are not limited in this context.

In on embodiment, RF front end 354 may pass at least a subset of the received signals to CPR elements 356. According, to one embodiment, CPR 356 may remove any cyclic prefix or guard intervals that may have been introduced during transmit processing of the received signals. In one embodiment, CPR 356 may provide the processed information to one or more associated FFT elements 358.

According to one embodiment, FFT elements 358 may transform the received signals from an associated receive chain from the time domain to the frequency domain, for subsequent demultiplexing and decoding of a representation of the information embedded within the received transmission. Thus, a plurality of frequency domain representations of the received signals may be presented to receive diversity agent 360.

In one embodiment, receive diversity agent 360 may perform a complementary function to that performed by transmit diversity agent 312. In this regard, receive diversity agent 360 may perform the complement to the transmit diversity and/or space frequency interleaving introduced above. In the case of transmit diversity, for example, receive diversity agent 360 may demap the QAM symbols prior to QAM demodulation and parallel to serial (P/S) conversion 362 extracting a representation (I') of the information encoded within the received signals. In the case of space-frequency interleaving, for example, receive diversity agent 360 may perform deinterleaving and decoding, before providing the output information to P/S transform 362 which generates the representation (I') of the information encoded within the received signals. According to one embodiment, diversity agent 360 may implement a minimum mean square error (MMSE) spatial demapper or maximum likelihood decoding, although the embodiments are not limited in this regard.

It may be appreciated that the operational blocks of diversity architecture 390 may be implemented in hardware, software, firmware, or an combination thereof. Moreover, although not explicitly denoted, it may be appreciated that one or more elements (e.g., diversity agents 312, 360) may receive control input from MAC 210. According to one embodiment, diversity agents 312, 360 may implement one or more of transmit diversity and space-frequency interleaving, and communicate which MIMO-OFDM scheme is being used through an exchange of channel state information. In this regard, diversity agents 312, 360 and the transmit diversity/space-frequency interleaving techniques associated therewith, may be adapted according to observed channel delay spread and transmit or receive antenna correlation information (e.g., channel state information). The embodiments are not limited in this context.

In an IEEE 802.16e MIMO-OFDM system, multiple transmit antennas can be used in diversity mode to provide greater range or in spatial multiplexing mode to provide higher throughput. Conventional spatial multiplexing MIMO modes may perform spatial multiplexing on 1-4 transmit antennas, with no coding across transmit antennas. On each antenna, independent with frequency-only bit-interleaved coded modulation (F-BICM) are transmitted. That is, forward error correcting (FEC) blocks of convolutionally coded input bits are interleaved across frequency tones but not across transmit antennas.

In an IEEE 802.16e MIMO-OFDM system such as system 100, however, diversity architecture 390 may implement space-frequency bit-interleaved coded modulation (SF-BICM). SF-BICM may interleave coded blocks across both spatial streams and frequency tones. Spatial streams are multiple data streams transmitted over multiple antennas, with or without some form of spatial pre-coding such as beamforming, covariance weighting or singular value decomposition. Space-frequency interleaving may provide spatial diversity in to addition to frequency diversity, especially with MMSE spatial filters per tone.

In addition, diversity architecture 390 may also enhance throughput by communicating coded blocks across multiple spatial streams. For example, multiple blocks M of to given size B may be formed for transmission across M transmission slots of M spatial streams without attempting to concatenate the blocks across the subchannels using block concatenation. This may be desirable, for example, since it retains the existing elements of the SISO chain and potentially reduces implementation impact. In another example, a single block of a given size M×B may be formed for transmission across M transmission slots of M spatial streams thereby concatenating blocks across the subchannels using block concatenation. This may be desirable, for example, since larger blocks may ensure that the number of sub-carriers used to carry the blocks is not reduced thereby retaining frequency diversity of the system.

To further improve performance, data from a block may be distributed across the spatial streams using bit interleaving or symbol interleaving. For example, blocks formed with or without block concatenation may be split into M spatial streams after the QAM modulation symbols are formed. This reduces the amount of changes needed to the channel encoding block used in the SISO interleaver. In another example, blocks may also be split into M spatial streams at the bit level using any number of bit level interleaving techniques.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
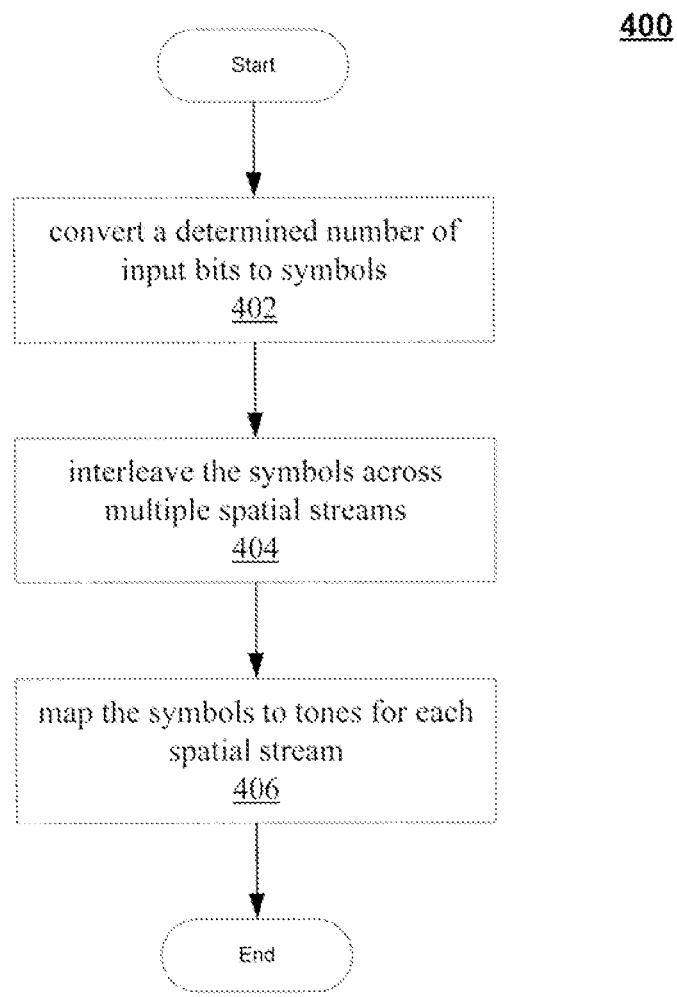
FIG. 4 illustrates one embodiment of a logic flow.

FIG. 4 illustrates one embodiment of a logic flow. FIG. 4 may illustrate a block flow diagram of a logic flow 400. Logic flow 400 may be representative of the operations executed by one or more systems described herein, such as diversity architecture 390 as implemented as part of nodes 110, 120 or 150, for example. As shown in logic flow 400, a determined number of input bits to symbols may be converted at block 402. The symbols may be interleaved across multiple spatial streams at block 404. The symbols may be mapped to tones for each spatial stream at block 406. Each spatial stream may then be transmitted over a separate antenna. The embodiments are not limited in this context.

In one embodiment, the input bits may be converted at block 402 by grouping the input bits into a single block, such as a FEC block, for example. The block may then be converted to symbols. The embodiments are not limited in this context.

In one embodiment, the input bit may be converted at block 402 by segmenting the input bits into multiple blocks. Each block may then be converted to symbols. The embodiments are not limited in this context.

In one embodiment, a cyclic shift of each spatial stream may be performed prior to mapping the symbols to each spatial stream. This may improve performance of a node and provide greater spatial diversity. The embodiments are not limited in this context.

Figure 5A:
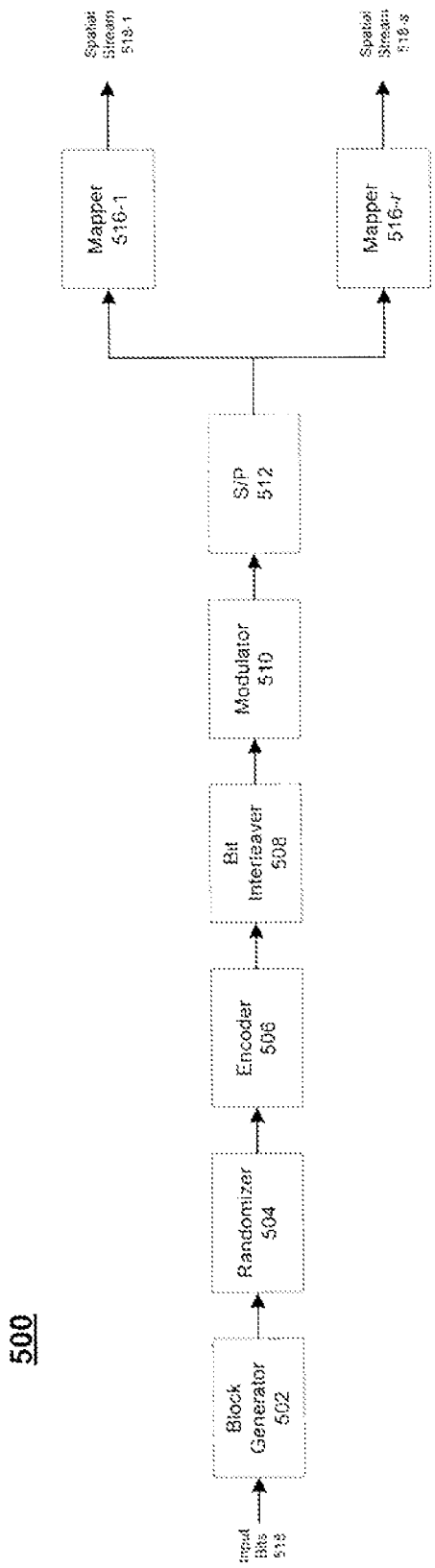
FIG. 5A illustrates one embodiment of an example diversity agent.

FIG. 5A illustrates one embodiment of an example diversity agent. FIG. 5A illustrates a block diagram of a diversity agent 500. In one embodiment, diversity agent 500 may be arranged to perform symbol level spatial interleaving. Diversity agent 500 may be representative of, for example, diversity agent 312 on the transmit side as described with reference to FIG. 3. It may be appreciated that the operational elements of diversity agent 500 may be reversed for implementation by diversity agent 360 on the receive side. The embodiments are not limited in this context.

As shown in FIG. 5A, diversity agent 500 may comprise multiple elements, such as block generator 502, randomizer 504, encoder 506, bit interleaver 508, modulator 510, S/P transform 512, and mapping elements 516-1-$r$. Some elements may be implemented using, for example, one or more circuits, components, registers, processors, software subroutines, or any combination thereof. Although FIG. 5A shows a limited number of elements, it can be appreciated that more or less elements may be used in diversity agent 500 as desired for a given implementation. The embodiments are not limited in this context.

In one embodiment, block generator 502 may receive a stream of input bits 502. Input bits 502 may represent any number of bits. In one embodiment, for example, the bits may comprise uncoded bits having a predetermined size of M×B bits. Block generator 502 may form the M×B bits into one or more blocks of bits. In one embodiment, for example, block generator 502 may group the M×B input bits into a single block of M×B bits in order to perform block concatenation, as described in more detail below. In one embodiment, for example, block generator 502 may segment the M×B input bits into multiple blocks M of B bits each. Block generator 502 may output the one or more blocks to randomizer 504.

In one embodiment, randomizer 504 may randomize or reorder the bits within each block. Randomizer 504 may output the randomized blocks to encoder 506.

In one embodiment, encoder 506 may perform coding for the bits within each block using a number of encoding techniques. Examples of coding techniques may include FEC encoding, convolutional encoding, Reed Solomon encoding, LDPC encoding, trellis encoding, turbo encoding, BCH encoding, and so forth. In one embodiment, for example the incoming uncoded bits are grouped into blocks of size MB bits and encoded with a convolutional code and punctured. Encoder 506 may output the coded blocks to bit interleaver 508.

In one embodiment, bit interleaver 508 may perform bit interleaving of bits within each block. Bit interleaver 508 may distribute the adjacent coded bits across tones in order to provide frequency diversity. In general, adjacent bits in a convolutionally coded sequence should be placed on tones separated by at least one coherence bandwidth in order to extract full frequency diversity in a frequency selective channel. A regular spacing of adjacent bits across tones may be desirable. In one embodiment, for example, bit interleaver 508 may perform bit interleaving in accordance with one or more IEEE 802.16e proposed standards. Bit interleaver 508 may output the interleaved block to modulator 510.

In one embodiment, modulator 510 may map the bits within each block to symbols. In one embodiment, for example, modulator 510 may Gray map the bits within each block to QAM symbols. Modulator 510 may output the QAM symbols to S/P transform 512.

In one embodiment, S/P transform 512 may multiplex the symbols across multiple spatial streams 518-1-$s$, with each spatial stream corresponding to a different antenna 320A . . . M, for example. For example, the QAM symbols may be multiplexed to mappers 516-1-$r$. Mappers 516-1-$r$ may map each received QAM symbol to one or more tones in the assigned subchannels in accordance with, for example, the IEEE 802.16e sub-channelization and tone-mapping techniques. In one embodiment, the same set of tones is occupied on each spatial stream 518-1-$s$. Spatial streams 518-1-$s$ may be processed in accordance with the remaining elements of diversity architecture 390 as described with reference to FIG. 3 for transmission to one or more remote devices via antennas 320A . . . M.

In one embodiment, diversity agent 500 may be arranged to perform symbol level spatial interleaving with block concatenation. For example, block generator 502 may group the M×B input bits into a single block of M×B bits to perform block concatenation. A single block of a given size M×B may be formed for transmission across M transmission slots of M spatial streams thereby concatenating blocks across the subchannels. The embodiments are not limited in this context.

In one embodiment, diversity agent 500 may be arranged to perform symbol level spatial interleaving without block concatenation. For example, block generator 502 may segment the M×B input bits into multiple blocks M of B bits each. Multiple blocks M of a given size B may be formed for transmission across M transmission slots of M spatial streams without attempting to concatenate the blocks across the subchannels. The embodiments are not limited in this context.

Figure 5B:
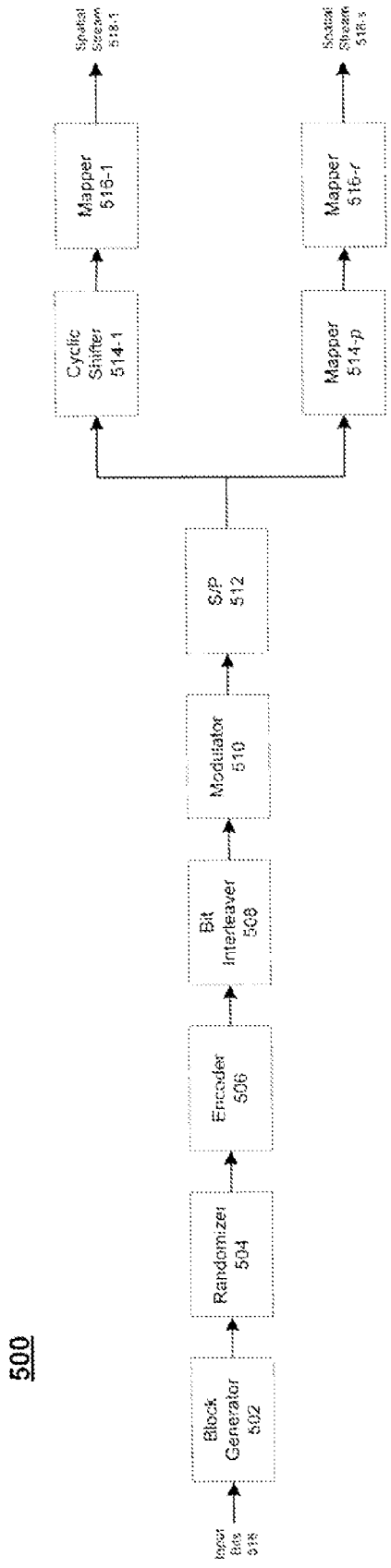
FIG. 5B illustrates one embodiment of an example diversity agent.

FIG. 5B illustrates one embodiment of an example diversity agent. FIG. 5B illustrates a block diagram of diversity agent 500 as described with reference to FIG. 5A. As shown in FIG. 5B, diversity agent 500 may be modified to include multiple cyclic shifters 514-1-$p$. Cyclic shifters 514-1-$p$ may introduce a cyclic shift of m−1 tones to the symbol sequence mapped to the $m^{th}$ antenna. This ensures that adjacent coded bits are not mapped to the same tone on different antennas. If adjacent tones are mapped to the same tone on different antennas, an MMSE receiver may correlate the noise on all the bits thereby degrading performance. Placing adjacent bits on different tones on different antennas de-correlates noise on adjacent bits, thus potentially improving performance and providing greater spatial diversity. As with the previous embodiments described with reference to FIG. 5A, cyclic shifting operations may be performed in conjunction with symbol level spatial interleaving implemented with block concatenation or without block concatenation, as desired for a given set of design constraints. The embodiments are not limited in this context.

Figure 6:
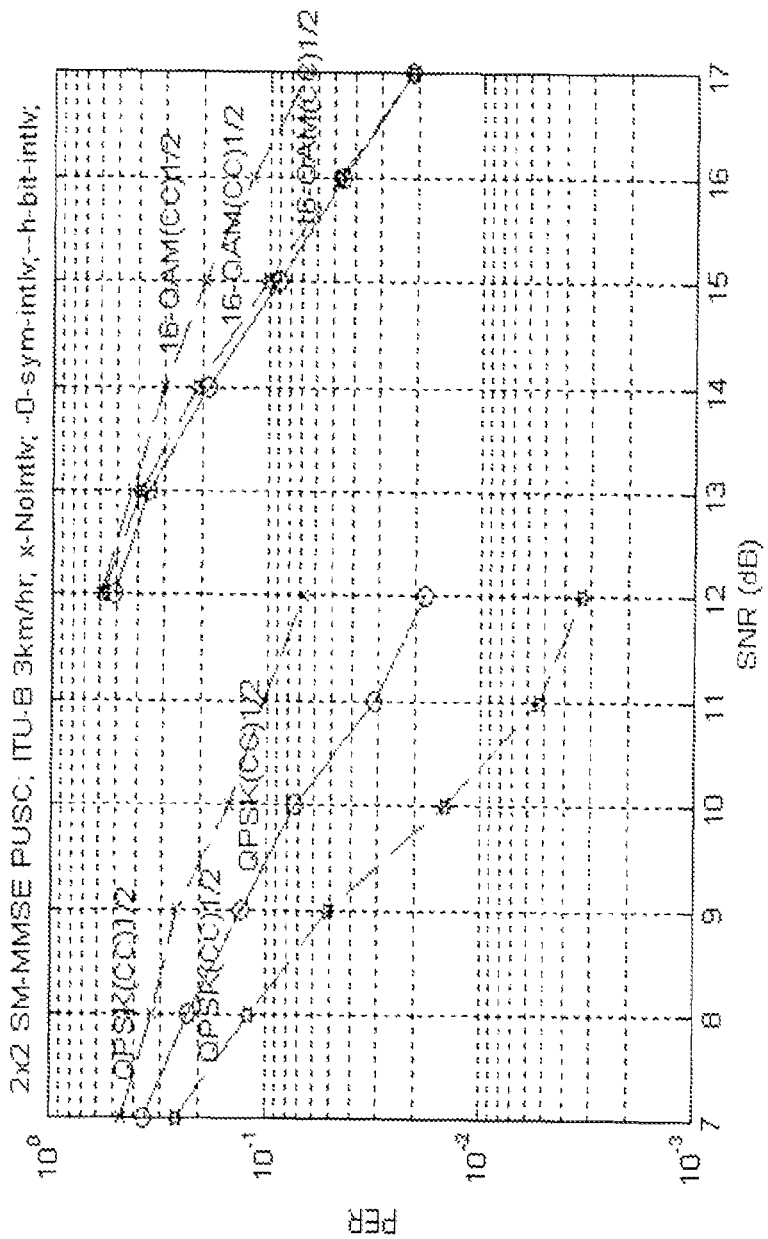
FIG. 6 illustrates one embodiment of a graphical representation.

FIG. 6 illustrates one embodiment of a graphical representation. FIG. 6 may be used to illustrate certain performance improvements of some embodiments relative to alternate techniques. As shown by FIG. 6, some embodiments may potentially provide superior performance while reducing complexity and impact to existing 802.16 standards, thereby providing a desirable solution for a given set of design constraints.

FIG. 6 illustrates a graph of packet error rate (PER) values versus signal to noise ratio (SNR) values for various embodiments. Performance of three schemes is shown in FIG. 6, including: (1) a SF-BICM labeled "- -h Bit Intlv", (2) a spatial multiplexing labeled "x-No Intlv", and (3) a symbol interleaver labeled "-0-Sym Intlv." The block interleaver takes consecutive blocks of B bits and multiplexes them to different antennas. Therefore bits on different transmit antennas are independent. On each antenna, 802.16e interleaving is followed. This technique (e.g., F-BICM) is expected to provide frequency diversity but no spatial diversity. The symbol interleaver multiplexes consecutive coded QAM symbols on different antennas. This technique (e.g., SF-BICM) is expected to provide some frequency diversity and some spatial diversity.

In FIG. 6, the slopes of MIMO+SFI are sharper than those of MIMO+SM, suggesting better diversity. Performance of symbol interleaving lies in between SF-BICM and F-BICM. With higher frequency diversity, SF-BICM outperforms F-BICM by 3 dB at a PER of 10%. SF-BICM provides a higher gain for lower data rates, extending the connectivity and cell range. The MMSE receiver induces correlation across antennas because of cross-talk, and the channel induces correlation across tones because of limited delay spread. Together these two factors induce correlation among adjacent tones on all antennas. Using a bit interleaver, bits may be placed on uncorrelated tones and antennas, thereby potentially improving performance with the MMSE receiver.

As further shown in FIG. 6, there is a limited difference between symbol and bit interleaving techniques using 16-QAM. For lower order modulation schemes, it appears that bit interleaving may provide better performance. Symbol level spatial interleaving, however, can obtain up to 1.5 dB of gain relative to conventional techniques.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS) or Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A base station comprising:
a transmit diversity agent to implement a transmit diversity technique wherein the transmit diversity agent is able to:
concatenate multiple blocks into a single block, convert said single block into symbols, perform a cyclic shift of a spatial stream such that adjacent input bits are mapped to different tones on different antennas, and map each of said symbols to different Orthogonal Frequency Division Multiplexing (OFDM) tones for each spatial stream.

2. The base station of claim 1, wherein said transmit diversity agent to segment said uncoded input bits into said multiple blocks of said given size.

3. The base station of claim 1, wherein said transmit diversity agent to perform the cyclic shift of each spatial stream prior to mapping said symbols to each spatial stream.

4. The base station of claim 1, wherein said transmit diversity agent to perform pre-coding of received information to quadrature amplitude modulation (QAM) symbols.

5. The base station of claim 1, comprising:
a radio frequency front-end operably couple to multiple antennas, said transmitter to receive each spatial stream from said transmit diversity agent, and to convert each spatial stream into a time domain representation before selectively directing the time domain information to said multiple antennas for transmission to a remote device.

6. A cellular network, comprising:
a base station to transmit Orthogonal Frequency Division Multiplexing (OFDM) radio frequency signal to a mobile device, the base station comprises:
multiple antennas;
a transceiver array to couple to said multiple antennas; and
a transmit diversity agent to couple to said transceiver array, wherein the transmit diversity agent is able to:
concatenate multiple blocks into a single block, convert said single block into symbols, perform a cyclic shift of a spatial stream such that adjacent input bits are mapped to different tones on different antennas, and map each of said symbols to OFDM tones for each spatial stream.

7. The cellular network of claim 6, wherein said transmit diversity agent is able to segment said uncoded input bits into said multiple blocks of said given size.

8. The cellular network of claim 6, wherein said transmit diversity agent to perform the cyclic shift of each spatial stream prior to mapping said symbols to each spatial stream.

9. The cellular network of claim 6, wherein said transmit diversity agent to perform pre-coding of received information to quadrature amplitude modulation (QAM) symbols.

10. The cellular network of claim 6, wherein the base station comprises:
a radio frequency front-end operably couple to multiple antennas, said transmitter to receive each spatial stream from said transmit diversity agent, and to convert each spatial stream into a time domain representation before selectively directing the time domain information to said multiple antennas for transmission to a remote device.

11. A method of transmitting from a base station of a cellular network by implementing a transmit diversity technique, comprising:
concatenating multiple blocks into a single block;
converting said single block into symbols;
performing a cyclic shift of a spatial stream such that adjacent input bits are mapped to different tones on different antennas; and
mapping each of said symbols to different Orthogonal Frequency Division Multiplexing (OFDM) tones for each spatial stream.

12. The method of claim 11, comprising segmenting said uncoded input bits into multiple blocks of said given size.

13. The method of claim 11, comprising performing the cyclic shift of each spatial stream prior to mapping said symbols to each spatial stream.

14. The method of claim 11, comprising transmitting each spatial stream over a separate antenna.

15. The method of claim 11, comprising pre-coding received information to quadrature amplitude modulation (QAM) symbols.

* * * * *